United States Patent [19]

Uerlings et al.

[11] Patent Number: 4,915,443
[45] Date of Patent: Apr. 10, 1990

[54] TRANSFORMABLE PASSENGER MOTOR VEHICLE

[75] Inventors: Rainer Uerlings, Rutesheim; Eugen Kolb, Stuttgart; Winfried Altmann, Weissach, all of Fed. Rep. of Germany

[73] Assignee: Dr. Ing. h.c.F. Porsche AG, Weissach, Fed. Rep. of Germany

[21] Appl. No.: 231,002

[22] Filed: Aug. 11, 1988

[30] Foreign Application Priority Data

Sep. 4, 1987 [DE] Fed. Rep. of Germany ....... 3729557

[51] Int. Cl.$^4$ .............................. B60J 7/00; B60J 7/19
[52] U.S. Cl. ..................................... 296/216; 296/224; 15/250.31; 49/248; 292/113
[58] Field of Search ............... 296/102, 103, 107, 136, 296/216, 224; 280/756; 15/250.31; 292/113, 247, DIG. 5, DIG. 49; 49/248

[56] References Cited

U.S. PATENT DOCUMENTS

| 1,973,071 | 9/1934 | Hilton | 15/250.31 X |
|---|---|---|---|
| 2,777,728 | 1/1957 | Barenyi | 296/216 X |
| 3,035,281 | 5/1962 | Pearson | 296/107 X |
| 3,266,838 | 8/1966 | Heincelman | 296/121 |
| 3,584,912 | 6/1971 | Leger | 296/117 |
| 3,610,681 | 10/1971 | Trenkler | 292/113 X |
| 3,826,530 | 7/1974 | Hoffmeyer et al. | 280/756 X |
| 4,595,230 | 6/1986 | Russell et al. | 296/216 X |
| 4,634,171 | 1/1987 | McKeag | 296/117 X |
| 4,805,956 | 2/1989 | Saunders | 296/103 X |

FOREIGN PATENT DOCUMENTS

| 913860 | 6/1954 | Fed. Rep. of Germany | 296/107 |
|---|---|---|---|
| 1117420 | 11/1961 | Fed. Rep. of Germany | 296/107 |
| 1268579 | 6/1961 | France | 296/216 |

OTHER PUBLICATIONS

Trade Journal "Car-Styling", vol. 17, 1977, pp. 25–31, Vehicle Study Pininfarina 104 Peugette.

*Primary Examiner*—Dennis H. Pedder
*Attorney, Agent, or Firm*—Barnes & Thornburg

[57] ABSTRACT

A transformable passenger motor vehicle with lateral doors and a passenger space is provided with a one-piece form-rigid covering that extends approximately at the height of the belt line of the open body and with the exception of a longitudinal cut-out for the driver closes the entire passenger space, whereby at least a forward and lateral partial area of the cut-out is surrounded by a window shield having a slight height. In order that the covering exhibits a good functioning combined with a simple construction and permits a comfortable egress from and ingress into the passenger space, the covering made of plastic material is pivotally supported at the body under interposition of two four-jointed hinges. For fixing the covering in its closed position, disengageable latching mechanisms interacting with windshield wiper mounting shafts are provided between the covering and the body.

29 Claims, 8 Drawing Sheets

TRANSFORMABLE PASSENGER MOTOR VEHICLE

BACKGROUND AND SUMMARY OF THE INVENTION

The present invention relates to a transformable passenger motor vehicle with lateral doors and a passenger space that is provided with a one-piece form-rigid covering which extends approximately at the height of the belt line of the open body and, with the exception of an elongated cut-out for the driver, closes off the entire passenger space, whereby at least a forward and lateral partial area of the cut-out is surrounded by a window shield having a slight height.

A known passenger motor vehicle of the aforementioned type (Trade Journal "Car-Styling", Volume 17, 1977, Pages 25-31, Vehicle Study Pininfarina 104 Peugette) can be converted into different versions by changing the body above the belt line. Inter alia, also a club-sport version is suggested in which the original windshield is removed and the passenger space is adapted to be closed off by a form-rigid covering which has exclusively an elongated cut-out for the head and shoulder area of a driver. However, the fastening of this covering arranged approximately at the height of the belt line at the body is not further explained.

It is the object of the present invention to provide a covering extending within the area of the belt line for the entire passenger space of a transformable passenger motor vehicle which combined with a simple construction has a good functioning and by means of which a convenient egress from and ingress into the passenger space is made possible.

The underlying problems are solved according to the present invention in that the covering made of plastic material is pivotally supported at the body under interposition of hinges and in that for fixing the covering in its closed position, disengageable latching devices are provided between the covering and the body.

The principal advantages achieved with the present invention reside in that a tilting-up of the form-rigid covering is made possible by the arrangement of hinges so that the egress out of and ingress into the vehicle passenger space can take place without any problem. A secure fixing of the covering during the driving operation is assured by the latching devices arranged between the covering and the body. The four-jointed with the obliquely inwardly drawn, forward guide members are so constructed that a functionally correct mounting and retention of the covering at the body is achieved. The gas springs engaging at the rear guide members effectively assist the opening movement of the covering. Owing to the removable windshield wiper shafts an already present hollow shaft is utilized for the latching mechanism so that the structural complexity and expenditure of the latching mechanism are simplified.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
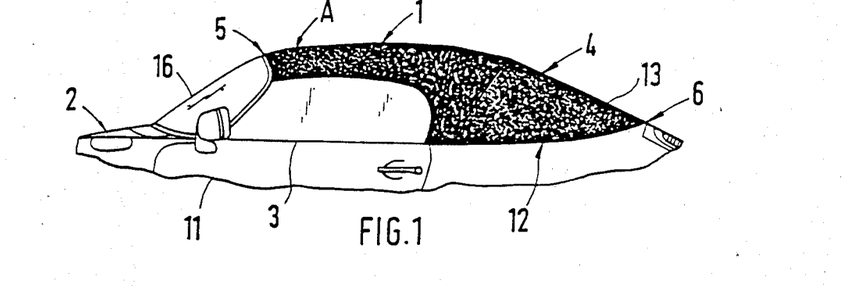
FIG. 1 is a partial side elevational view of a transformable passenger motor vehicle with a convertible top in accordance with the present invention.

Referring now to the drawing wherein like reference numerals are used throughout the various views to designate like parts, and more particularly to FIG. 1, a transformable two-seater passenger motor vehicle 1 is illustrated in this figure whose body 2 includes above a belt line 3 a foldable top 4 which extends between a windshield frame 5 and a rear area 6. The foldable top 4 is retained in position in its closed position A at the windshield frame 5 by way of latching mechanisms (not shown). After disengaging the latching mechanisms, the foldable top 4 can be pivoted to the rear of the two front seats 7.

Figure 3:
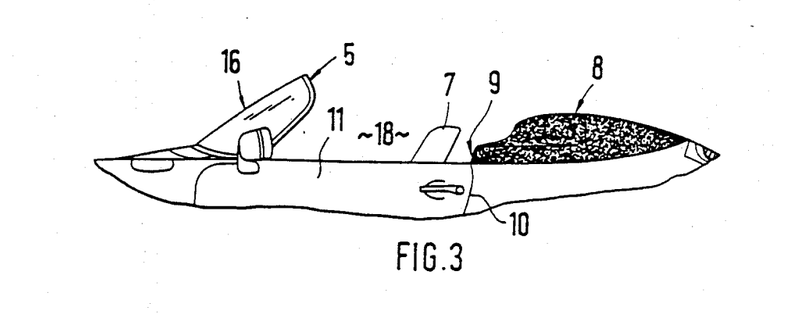
FIG. 3 is a partial side elevational view of the transformable passenger motor vehicle in an open version.

According to FIG. 3, the folded-back top 4 is arranged underneath a rear covering 8 made of plastic material which is pivotally connected at the body 2. The aerodynamically constructed rear covering 8 is matched in plan view to the arcuately shaped configuration of the rear contour. A forward end 9 of the rear covering 8 extends within the area of a rear boundary edge 10 of a lateral door 11. For closing the foldable top 4, the rear covering 8 is pivoted up toward the rear. In the closed position A of the foldable top 4 (FIG. 1), the edge of the top material 13 of the foldable top 4 which extends within the area of the belt line 3 is suspended at the rear covering 8 by means of U-shaped retaining members of any known construction (not shown) in such a manner that the top material 13 covers the rear covering 8 disposed therebelow.

Figure 2:
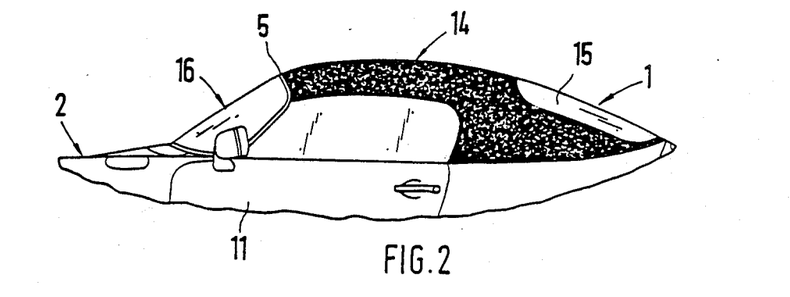
FIG. 2 is a partial side elevational view of the transformable passenger motor vehicle with a hard top in accordance with the present invention.

FIG. 2 illustrates a hard to 14 for the transformable passenger motor vehicle 1 which can be installed on the body 2 in lieu of the foldable top 4. The hard top 14 can be constructed in one piece or multi-partite and includes a rigid rear wall window 15. The windshield frame 5 surrounding a windshield 16 is detachably secured at the body 2.

Figure 4:
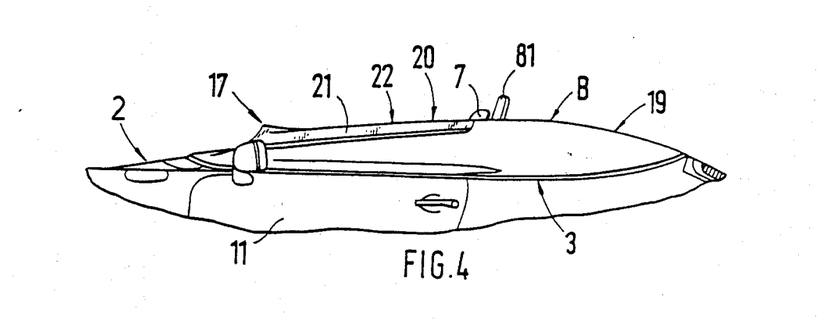
FIG. 4 is a partial side elevational view of the transformable passenger motor vehicle in a club sport version.
Figure 5:
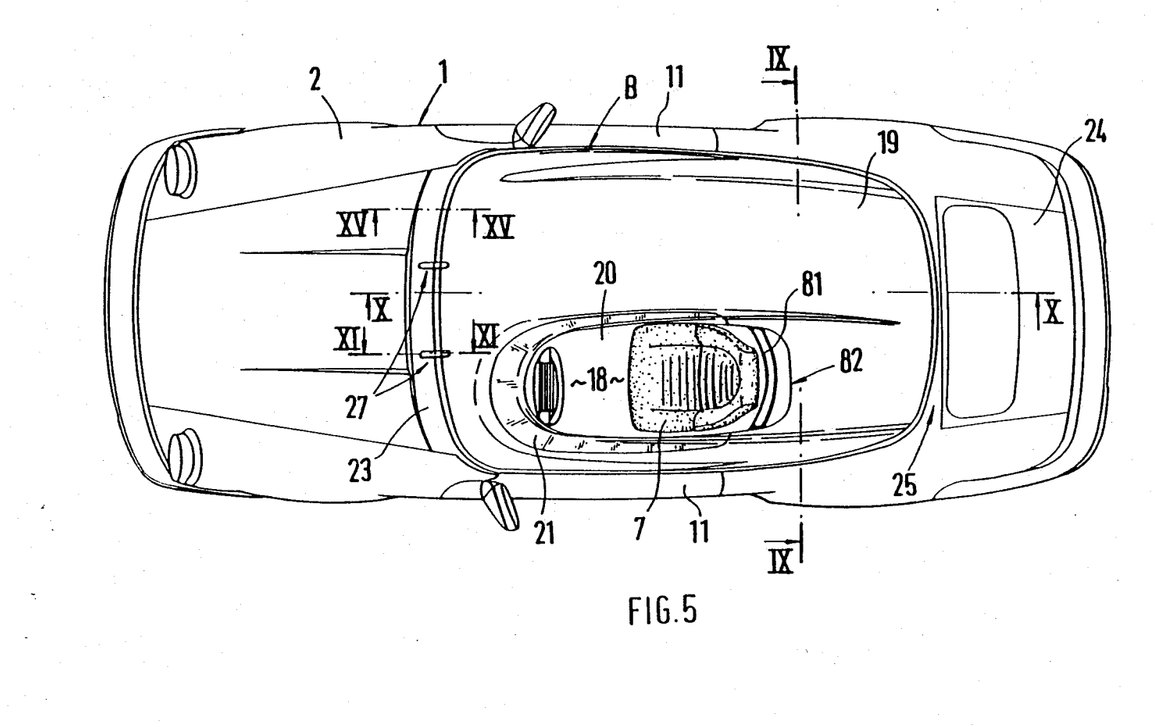
FIG. 5 is a plan view on the club sport version passenger motor vehicle of FIG. 4.

In the club-sport version 17 of the transformable passenger motor vehicle 1 illustrated in FIGS. 4 and 5, the original windshield 16 has been removed and the complete passenger space 18 is provided with a one-piece form-rigid covering 19 which extends along the edge approximately at the height of the belt line 3. The covering 19 includes exclusively an elongated cut-out 20 for the head- and shoulder-area of a driver. At least the forward and the two lateral edge areas of the cut-out 20 are surrounded by a one-piece window shield 21 which has a slight height. The window shield 21 made of Plexiglas or glass is connected with the covering 19 made of synthetic plastic material by adhesion. To the rear of the cut-out 20, the covering 19 having an aerodynamic shape is drawn up and is aligned approximately with an upper boundary edge 22 of the window shield 21 (FIG. 4). The covering 19 extends, as viewed in the transverse direction, over a considerable part of the width of the passenger motor vehicle (FIG. 5) and adjoins an upper edge of the two doors 11 (FIG. 4). As viewed in the longitudinal direction, the covering 19 extends between a forward cowl cross bearer 23 and a box-shaped cross bearer 25 arranged above a rear lid 24 (FIG. 5).

Figure 7:
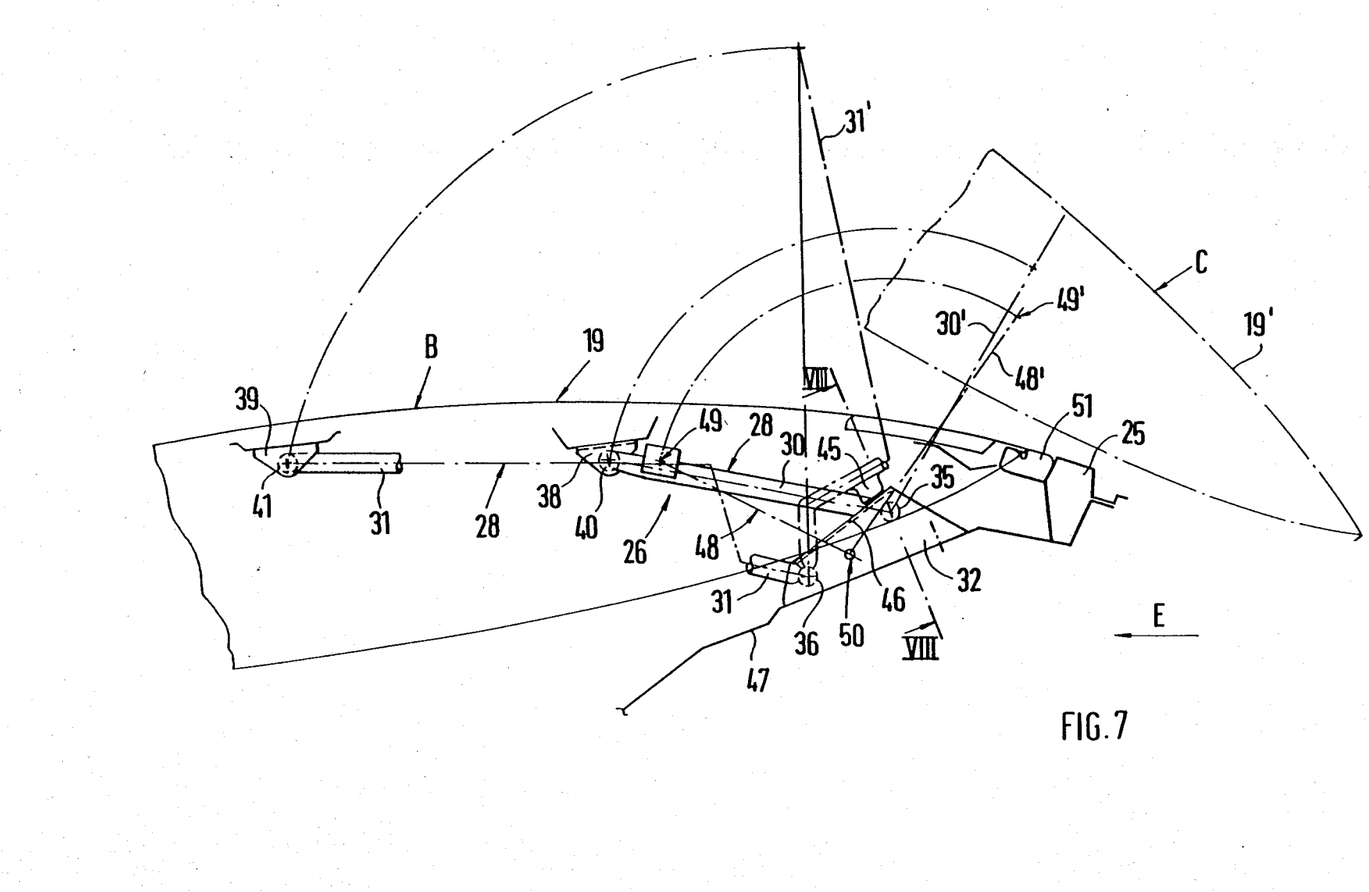
FIG. 7 is a somewhat schematic elevational view taken in the direction of arrow R of FIG. 6, on an enlarged scale.

In order to assure a comfortable egress out of and ingress into the passenger space 18, the covering 19 is pivotally supported at the body 2 under interposition of hinges 26 (FIG. 7). For fixing the covering 19 in its closed position B, disengageable latching mechanisms 27 are provided between the covering 19 and the body 2 which are actuatable from the passenger space 18 and/or from the vehicle outside (FIG. 5).

The covering 19 is movable from the approximately horizontally aligned closed position B (FIGS. 4 and 7) rearwardly into an obliquely extending open position C and vice versa. According to FIG. 7, the hinges 26 are arranged in the rear area of the covering 19—and more particularly at the two longitudinal sides—and are preferably constructed as four-jointed hinges generally designated by reference numeral 28.

Figure 8:
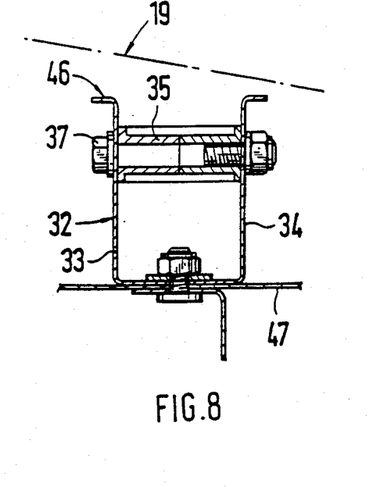
FIG. 8 is a cross-sectional view, taken along line VIII—VIII of FIG. 7, on an enlarged scale.
Figure 9:
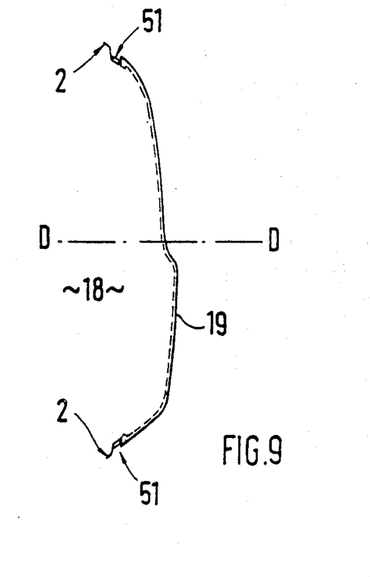
FIG. 9 is a cross-sectional view, taken along line IX—IX of FIG. 5, on an enlarged scale.
Figure 10:
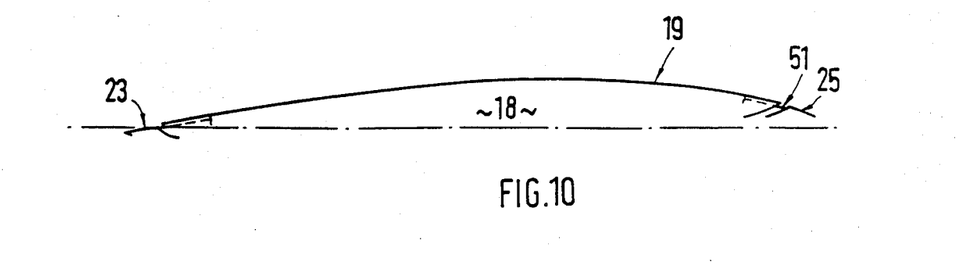
FIG. 10 is a cross-sectional view, taken along line X—X of FIG. 5, on an enlarged scale.

Each four-jointed hinge 28 includes two tubularly shaped guide members 30 and 31 which are rotatably connected, on the one hand, with the body 2 and, on the other, with the covering 19. For the pivotal connection on the side of the body a common bearing bracket 32 is provided for the two guide members 30 and 31 of each four-jointed hinge 28; the bearing bracket 32 is aligned approximately parallel to a longitudinal center plane D—D (FIG. 6) and extends with a lateral spacing with respect thereto. The bearing bracket 32 is constructed approximately U-shaped, as viewed in cross section, and accommodates between two upright webs 33 and 34 transversely extending tubular end sections 35 and 36 of the two guide members 30 and 31 by means of a bolt 37. The open side of the U-shaped bearing bracket 32 is directed upwardly (FIG. 8).

Figure 6:
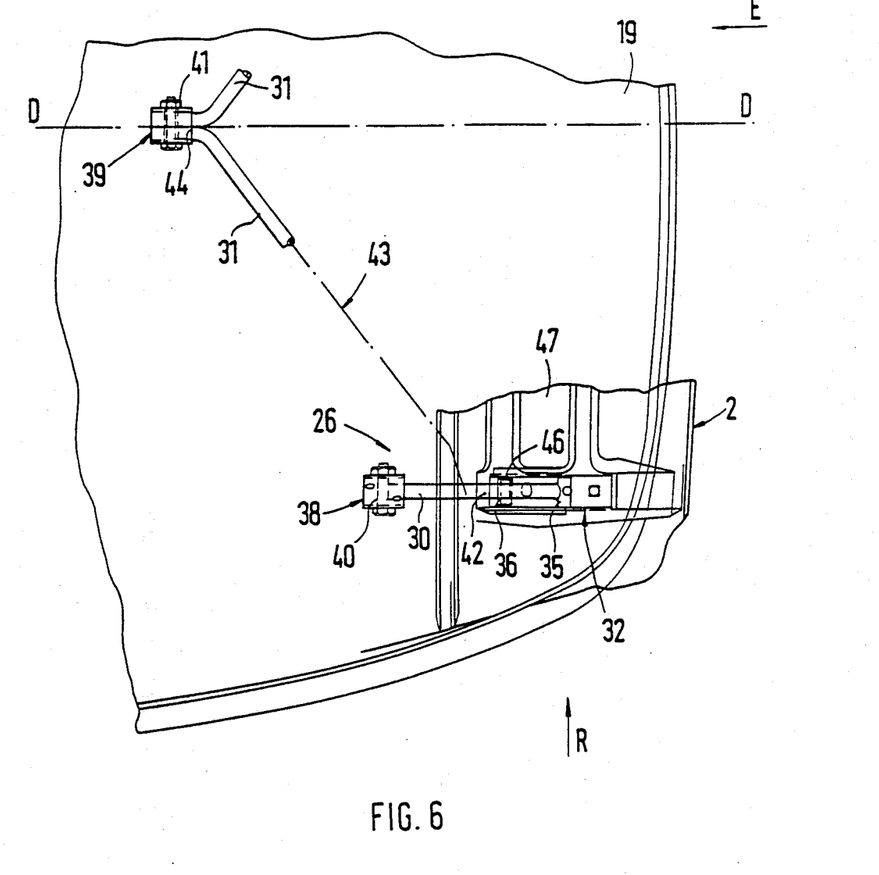
FIG. 6 is a partial plan view, corresponding to FIG. 5, on the covering with the hinges, on an enlarged scale.

Separate bearings 38 and 39 for the guide members 30 and 31 of the four-jointed hinge 28 are provided at the covering 19 (FIG. 6). The bearings 38 for the rear guide members 30, as viewed in the driving direction, are arranged in a lateral outwardly disposed area of the covering 19. For the forwardly disposed guide members 31 of the two four-jointed hinges 28 a common bearing 39 is provided in the vehicle longitudinal center plane D—D. At their upper ends, the guide members 30 and 31 include transversely extending tubular sections 40 and 41 through which are extended bolts of the bearings 38 and 39. The shorter rearwardly disposed guide member 30 is constructed rectilinearly and extends parallel to the vehicle longitudinal center plane D—D. The two guide members 31 are composed of two end sections 42 and 44 extending approximately in the vehicle longitudinal direction and of an obliquely directed middle section 43, whereby the section 43 extends adjoining the inside of the covering 19. Local abutments 45 are provided at both guide members 31, by means of which the covering 19 is fixed in its open position C. The abutments 45 are supported at inwardly disposed flanges 46 of the bearing bracket 32 on the body side (FIG. 7).

The bearing bracket 32 on the side of the body is constructed approximately triangularly shaped, as viewed in side view, and is secured by means of bolts at a body wall 47 extending adjacent the cross bearer 25. For assisting the opening movement of the covering 19, a gas spring 48 is provided whose one end 49 is connected with the rear guide member 30 and whose other end 50 is connected with the bearing bracket 32. Of the gas spring 48, only a center line is indicated in FIGS. 6 and 7. The end 49 on the side of the guide member is connected to the guide member 30 adjacent the tubular cross member 40. The other end 50 of the gas spring 48 is jointedly connected with the bearing bracket 32 between the two tubular cross members 35 and 36—as viewed in longitudinal direction. In the closed position B, the gas spring 48 extends underneath the guide member 30 whereas in the open position C, the gas spring 48' crosses the guide member 30' in a center area of its longitudinal extent.

Figures 14, 15:
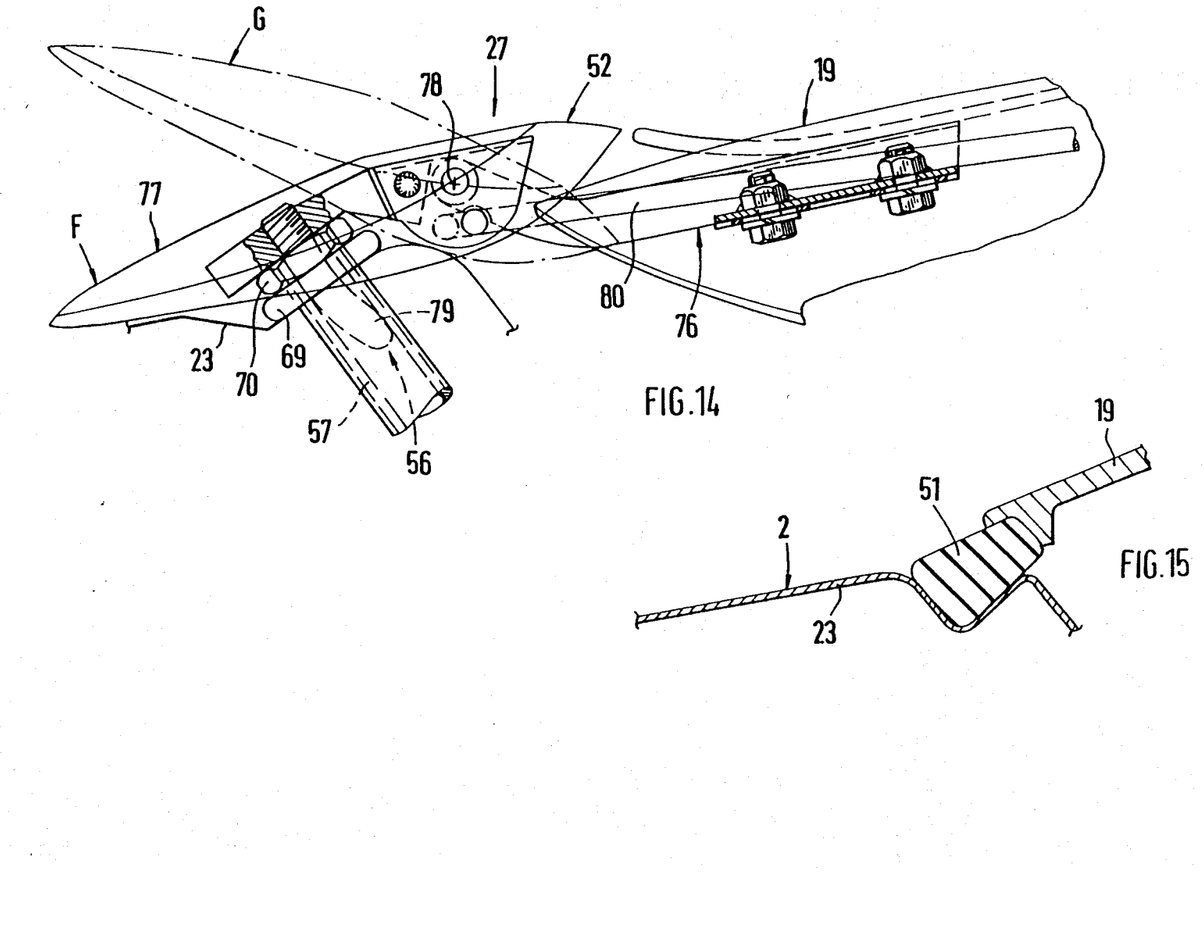
FIG. 14 is a side elevational view of a second embodiment of a latching mechanism in accordance with the present invention, partly in cross section.
FIG. 15 is a cross-sectional view taken along line XV—XV of FIG. 5, on an enlarged scale.

The covering 19 is circumferentially connected at the body 2 under interposition of a sealing member 51 whereby the sealing member 51 is attached either at the body 2 or at the covering 19 (FIG. 15). However, the possibility also exists that a sealing member 51 is provided both at the body 2 as also at the covering 19.

Figure 11:
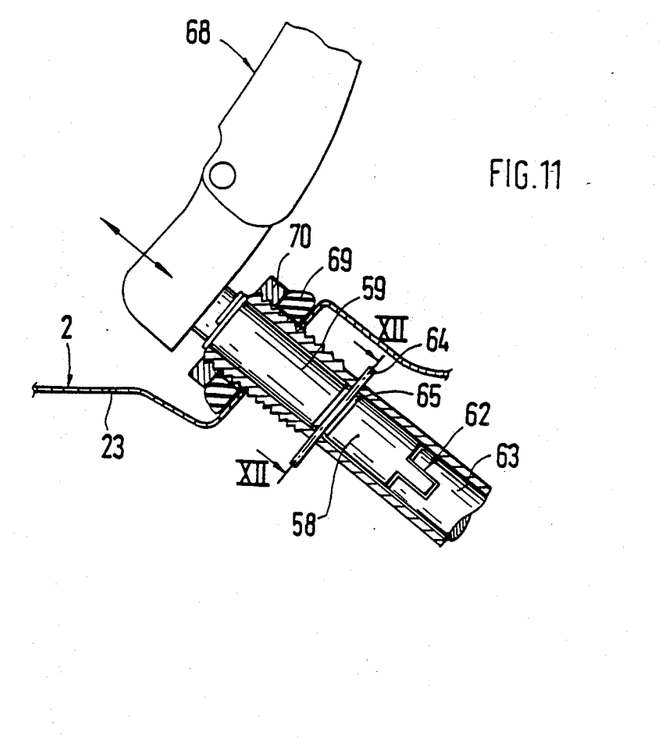
FIG. 11 is a cross-sectional view, taken along line XI—XI of FIG. 5, through the cowl cross bearer within the area of a windshield wiper shaft.
Figure 12:
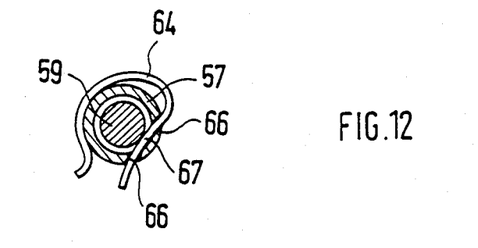
FIG. 12 is a cross-sectional view, taken along line XII—XII of FIG. 11.

According to FIG. 5, the two disengageable latching mechanisms 27 are arranged between a forward edge area of the covering 19 and the adjoining cowl cross bearer 23. Each latching mechanism 27 includes a latching member 52 secured at the covering 19 which includes at its free end 53 adjacent an abutment surface 54 a downwardly protruding pin 55 that cooperates with a mounting 56 on the side of the body. The mounting 56 for the pin 55 is formed by a hollow shaft 57 which normally receives a windshield wiper shaft 58 (FIG. 11). After pulling out a removable section 59 of the windshield wiper shaft 58, the pin 55 can be inserted into the hollow shaft 57. The pin 55 is composed according to FIG. 13 of a cylindrical core 60 and of a sheathing 61 made of plastic material or rubber whereby the cross section of the pin 55 is continuously reduced towards its free downwardly disposed end.

The removable section 59 of the windshield wiper shaft 58 cooperates with a fixed section 63 of the windshield wiper shaft 58 by way of a form-locking connection 62 (groove-spring arrangement) as shown in FIG. 11. A retaining spring 64 is provided for the axial fixing of the detachable section 59 in its installed position which cooperates with an annular groove 65 of the section 59 and of the hollow shaft 57. The retaining spring 64 surrounds the hollow shaft 57 whereby an opening 66 is locally provided at the hollow shaft for the insertion of a leg 67 of the retaining spring 64. The section 59 of the windshield wiper shaft 58 is constructed in one piece with a wiper arm 68. For fastening the hollow shaft 57, a rubber ring 69 and a nut 70 is mounted on its forward end.

Figure 13:
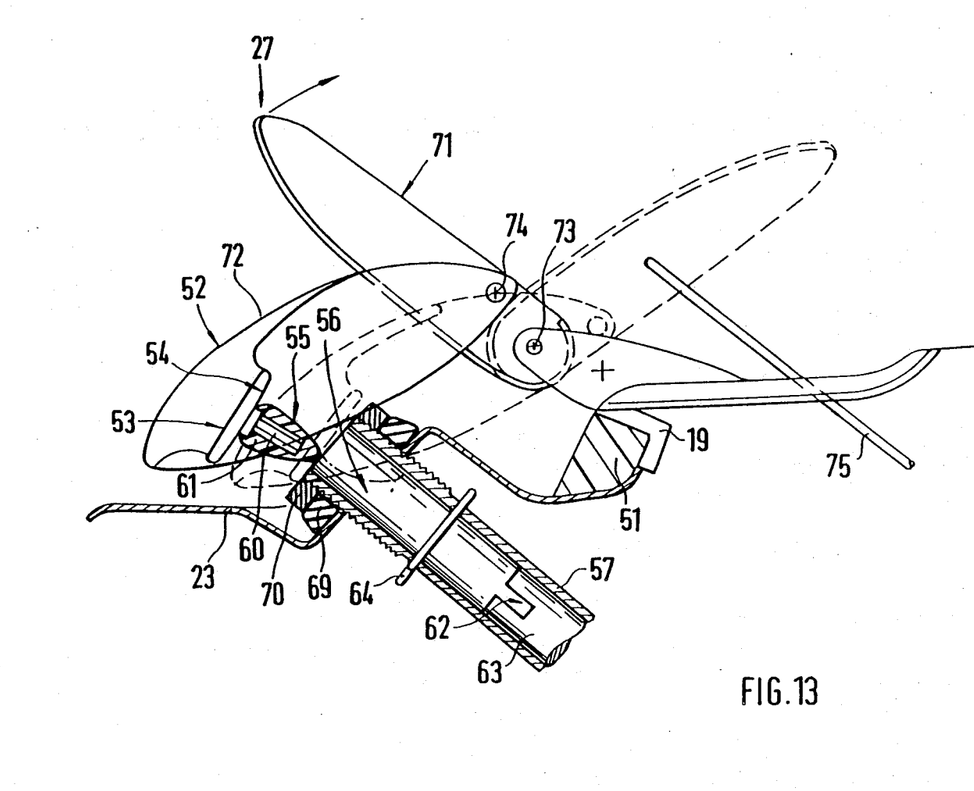
FIG. 13 is a side elevational view of a first embodiment of a latching mechanism in accordance with the present invention, partly in cross section.

According to FIG. 13, the latching member 52 includes a handle part 71 pivotally supported at the covering 19 which is rotatably connected with a clamping member 72. The pin 55 is arranged at the clamping member 72. A point of rotation 73 of the handle part 71 and the point of rotation 74 of the clamping member 72 are so arranged mutually offset that a type of knee lever latching mechanism is formed. A linkage 75 which engages at the handle part 71 and protrudes through the covering 19 into the passenger space 18, assures that the latching mechanism 27 is also actutable from the passenger space 18.

In the embodiment illustrated in FIG. 14, the latching member 52 is formed by a part 76 secured at the inside of the covering 19 and by a handle part 77 which are rotatably connected with each other at 78. The pin 79 cooperating with the mounting 56 is arranged at the handle part 77. The area of the pin 79 protruding into the mounting 56 has a configuration in the shape of a circular arc and is locally supported at the mounting 56.

A linkage 80 engages at the handle part 77 remote from the point of rotation 78, whose end protruding into the passenger space 18 cooperates with an actuating mechanism (not shown) which is provided at the covering 19.

In the latched position of the latching mechanism 27, the handle part 77 assumes a position F whereas the unlatched position of the handle part 77 is designated by G.

Furthermore, in the one-seater club-sport version 17, a rollover bar 81 is provided which is secured at the body 2 and extends within the area of the cutout 20 of the covering 19. The rollover bar 81 has a small width and is provided to the rear of the backrest of the front seat 7 adjacent a rear end 82 of the cutout 20. The same four-jointed hinges 28 may be utilized for the rear covering 8 according to FIG. 3 as for the covering 19.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A transformable passenger motor vehicle arrangement for vehicles with lateral doors and a passenger space, comprising:
    a one-piece form-rigid covering means adapted to extend approximately at a vehicle belt line height of an open vehicle body, said covering means serving to close off the entire passenger space except for a longitudinal cut out section for a vehicle driver,
    pivot connection means for pivotally moving the covering means between a closed driving position and an open driver ingress and engress position for accommodating ingress and egress of the driver when the vehicle is not being driven,
    wherein the pivot connection means includes one four-jointed hinge means arranged at each of the two longitudinal sides of the covering means, said hinge means including two guide members that are pivotally connected, on the one hand, with the vehicle body and, on the other, with the covering means, and
    and cover latching means for latching the covering means in its closed driving position.

2. A transformable passenger motor vehicle arrangement according to claim 1, wherein the one-piece form-rigid covering means extends in forward, rearward, and both lateral directions from the longitudinal cut out section to respective edges of the covering means such that said cut out section exhibits a closed solid oval shape completely surrounding the driver when in an in-use installed position on a vehicle.

3. A transformable passenger motor vehicle arrangement according to claim 1, wherein a common bearing bracket means is provided on the vehicle body side for the pivotal connection of the two guide members of each four-jointed hinge means.

4. A transformable passenger motor vehicle according to claim 3, wherein one of the two guide members of each of the four-joint hinge means is a forwardly disposed guide member, wherein separate bearing means are arranged at the covering means for the guide members, and wherein one of said separate bearing means is a common bearing means extending approximately in the vehicle longitudinal center plane which is provided for the forwardly disposed guide members of the two four-jointed hinge means, as viewed in the driving direction.

5. A transformable passenger motor vehicle arrangement according to claim 4, wherein the forwardly disposed guide members of the two four-jointed hinge means extend from the outwardly disposed bearing bracket means on the body side obliquely inwardly toward the center common bearing means of the covering means.

6. A transformable passenger motor vehicle arrangement according to claim 5, wherein one abutment means each is provided at the forwardly disposed guide members adjacent the bearing bracket means, the abutment means being supported in the open position of the covering means at a flange of the bearing bracket means.

7. A transformable passenger motor vehicle arrangement according to claim 6, wherein one of the two guide members of each of the four-joint hinge means is a rearwardly disposed guide member, wherein the rearwardly disposed guide member of the four-jointed hinge means, as viewed in the driving direction, is acted on by a gas spring means during movement between the closed and open positions of the cover means.

8. A transformable passenger motor vehicle arrangement according to claim 7, wherein the gas spring means is operatively connected to an upper end of the rearwardly disposed guide member and to the fixed bearing bracket means.

9. A transformable passenger motor vehicle arrangement according to claim 1, wherein one of the two guide members of each of the four-joint hinge means is a forwardly disposed guide member, wherein separate bearing means are arranged at the covering means for the guide members, and wherein one of said separate bearing means is a common bearing means extending approximately in the vehicle longitudinal center plane which is provided for the forwardly disposed guide members of the two four-jointed hinge means, as viewed in the driving direction.

10. A transformable passenger motor vehicle arrangement according to claim 9, wherein the forwardly disposed guide members of the two four-jointed hinge means extend from the outwardly disposed bearing bracket means on the body side obliquely inwardly toward the center common bearing means of the covering means.

11. A transformable passenger motor vehicle arrangement according to claim 9, wherein one abutment means each is provided at the forwardly disposed guide members adjacent the bearing bracket mweans, the abutment means being supported in the open position of the covering means at a flange of the bearing bracket means.

12. A transformable passenger motor vehicle arrangement according to claim 1, wherein the covering means rests in its closed position on the body under interposition of circumferential seal means.

13. A transformable passenger motor vehicle arrangement according to claim 1, wherein the cover latching means includes disengageable latching means arranged between a forward edge area of the covering means and an adjoining cowl cross bearer means of the vehicle body.

14. A transformable passenger motor vehicle arrangement according to claim 13, wherein each disengageable latching means includes a latching member secured at the covering means which engages by means of a pin into a mounting means on the vehicle body side.

15. A transformable passenger motor vehicle arrangement according to claim 14, wherein the mounting means is formed by a hollow shaft which normally receives a windshield wiper shaft, and wherein after pulling out a removable section of the windshield wiper shaft, the pin of the latching member is adapted to be inserted into the mounting means.

16. A transformable passenger motor vehicle arrangement according to claim 15, wherein the removable section of the windshield wiper shaft is operable to be connected by way of a form-locking connection with a fixed section of the windshield wiper shaft.

17. A transformable passenger motor vehicle arrangement according to claim 15, wherein a retaining spring means is provided for fixing the removable section of the windshield wiper shaft to the hollow shaft, the retaining spring means engaging an annular groove of the removable section via an opening provided in the hollow shaft.

18. A transformable passenger motor vehicle arrangement according to claim 16, wherein the latching member includes a handle part rotatably supported at the covering means, the handle part being pivotally connected with a clamping member, the downwardly protruding pin being arranged at the clamping member adjacent an abutment surface.

19. A transformable passenger motor vehicle arrangement according to claim 14, wherein the latching member includes a part secured at the inside of the covering means which is jointedly connected with a handle part by way of a pivot point, the pin cooperating with the mounting means being provided at the handle part.

20. A transformable passenger motor vehicle arrangement according to claim 1, wherein a rearwardly disposed one of the guide members of the four-jointed hinge means, as viewed in the driving direction, is acted upon by a gas spring means during movement of the cover means between the closed and open positions.

21. A transformable passenger motor vehicle arrangement according to claim 20, wherein the gas spring means is operatively connected to an upper end of the rearwardly disposed guide member and to a fixed bearing bracket means.

22. A transformable passenger motor vehicle arrangement according to claim 1, comprising a rollover bar extending inside of the cut-out of the covering means within a rear edge area of the cut-out.

23. A transformable passenger motor vehicle arrangement according to claim 22, wherein the covering means rests in its closed position on the body under interposition of circumferential seal means.

24. A transformable passenger motor vehicle arrangement according to claim 23, wherein the pivot connection means includes means for positively guiding movement of the covering means between an approximately closed horizontal position and the open position.

25. A transformable passenger motor vehicle arrangement according to claim 1, wherein gas spring means are interposed between the cover means and vehicle to assist in movement of the cover means between said closed and open positions.

26. A transformable passenger motor vehicle arrangement according to claim 1, wherein the one-piece form-rigid covering means extends in forward, rearward, and both lateral directions from the longitudinal cut out section to respective edges of the covering means such that said cut out section exhibits a closed solid oval shape completely surrounding the driver when in an in-use installed position on a vehicle.

27. A transformable passenger motor vehicle arrangement according to claim 1, wherein said covering means is made of plastic.

28. A transformable passenger motor vehicle arrangement according to claim 1, wherein at least a forward and lateral partial area of the cut out are surrounded by a window shield.

29. A transformable passenger motor vehicle arrangement according to claim 28, wherein said covering means is made of plastic.

* * * * *